United States Patent
Jayasimha et al.

(10) Patent No.: US 11,581,958 B2
(45) Date of Patent: Feb. 14, 2023

(54) MUTUAL COUPLING BASED CALIBRATION WITH OFDM SIGNALS

(71) Applicant: AST & Science, LLC, Miami, FL (US)

(72) Inventors: Sriram Jayasimha, Leicester (GB); Christos Kasparis, Miami, FL (US); Peter King, Miami, FL (US); David Wheeler, Miami, FL (US); Huiwen Yao, Potomac, MD (US)

(73) Assignee: AST & Science, LLC, Miami, FL (US)

( * ) Notice: Subject to any disclaimer, the term of this patent is extended or adjusted under 35 U.S.C. 154(b) by 0 days.

(21) Appl. No.: 17/696,547

(22) Filed: Mar. 16, 2022

(65) Prior Publication Data

US 2022/0303028 A1   Sep. 22, 2022

Related U.S. Application Data

(60) Provisional application No. 63/161,701, filed on Mar. 16, 2021.

(51) Int. Cl.
*H04B 17/12* (2015.01)
*H04L 27/26* (2006.01)

(52) U.S. Cl.
CPC ......... *H04B 17/12* (2015.01); *H04L 27/2626* (2013.01)

(58) Field of Classification Search
CPC ................................ H04B 17/11; H04B 17/12
See application file for complete search history.

(56) References Cited

U.S. PATENT DOCUMENTS

| | | | |
|---|---|---|---|
| 9,973,266 B1 | 5/2018 | Avellan et al. | |
| 10,284,308 B1* | 5/2019 | Elwailly | H04B 17/11 |
| 10,972,195 B1 | 4/2021 | Yao et al. | |
| 10,979,133 B2 | 4/2021 | Avellan et al. | |
| 10,993,242 B1* | 4/2021 | Kim | H04L 5/0023 |
| 2005/0143040 A1 | 6/2005 | Kerth et al. | |
| 2011/0170690 A1 | 7/2011 | Shpantzer | |
| 2012/0313821 A1* | 12/2012 | Fischer | H01Q 9/28 |
| | | | 343/700 MS |
| 2014/0242914 A1 | 8/2014 | Monroe | |
| 2018/0034541 A1 | 2/2018 | Chen et al. | |
| 2019/0238216 A1 | 8/2019 | Avellan et al. | |
| 2019/0372235 A1 | 12/2019 | Schulz et al. | |
| 2021/0344111 A1* | 11/2021 | Kihira | H04B 17/12 |

FOREIGN PATENT DOCUMENTS

CN   107682098 A  *  2/2018  ............. H04B 17/12

OTHER PUBLICATIONS

A. B. Awoseyila, et al., "Improved Single Frequency Estimation with Wide Acquisition Range", Electronics Letters, vol. 44(3), pp. 245-247; Jan. 31, 2008.
International Search Report and Written Opinion received in PCT Application No. PCT/US2022/020593, dated Jun. 14, 2022.

* cited by examiner

*Primary Examiner* — Kevin Kim
(74) *Attorney, Agent, or Firm* — Blank Rome LLP

(57) ABSTRACT

OFDM-BPSK symbol sequences are used for mutual-coupling based phase array calibration. Such substitution allows phase to be estimated more accurately using a given estimation duration without compromising other estimates' (amplitude and group delay) accuracies.

15 Claims, 7 Drawing Sheets

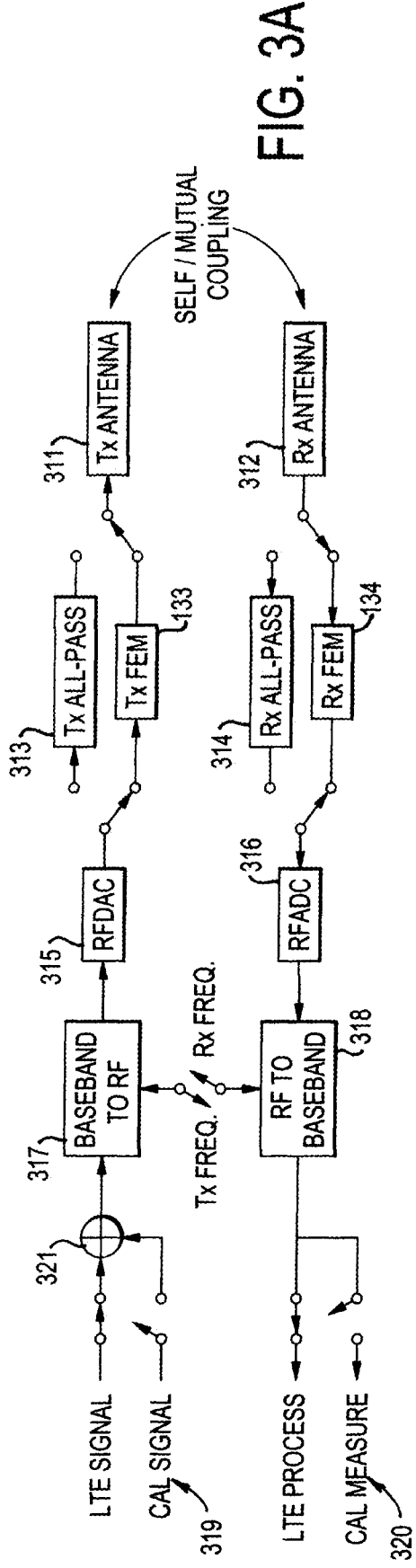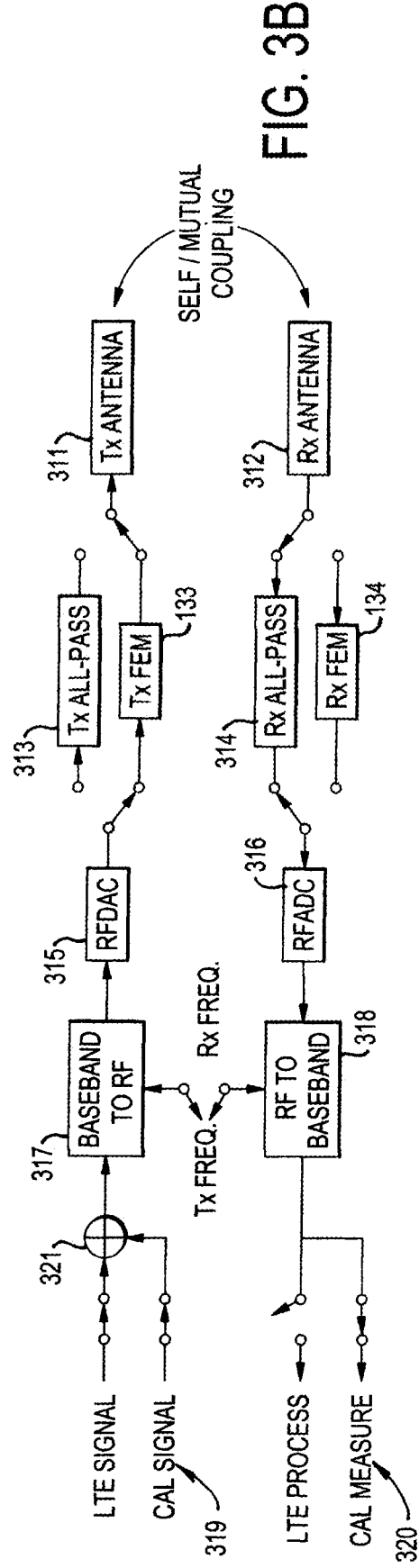

MUTUAL COUPLING BASED CALIBRATION WITH OFDM SIGNALS

CROSS-REFERENCE TO RELATED APPLICATIONS

The present application claims priority to U.S. Provisional Application No. 63/161,701, filed on Mar. 16, 2021, the contents of which are hereby incorporated in their entirety.

FIELD

The disclosure relates to performing mutual-coupling based calibration of antenna elements in a phased array.

BACKGROUND

U.S. Pat. Nos. 9,973,266 and 10,979,133 shows a system for assembling a large number of small satellite antennas in space to form a large array. The array forms service beams for radio communications with designated "cells" on the Earth's surface). The entire content of those patents is incorporated herein by reference. Each small satellite in the array has of one or more digital beam-forming (DBF) processor(s), a corresponding number of transmit/receive (T/R) module and antenna elements.

SUMMARY

This application improves upon U.S. patent Ser. No. 10/972,195B1 issued on Apr. 6, 2021 by using OFDM-BPSK symbol sequences rather than CDMA sequences for mutual-coupling based phase array calibration. Such substitution allows phase to be estimated more accurately using a given estimation duration without compromising other estimates' (amplitude and group delay) accuracies. The entire content of U.S. patent Ser. No. 10/972,195B1 is relied upon and incorporated herein by reference in its entirety.

One limitation of phased arrays is that, to form beams in the array assembly to and from ground regions, accurate characterization of the amplitude and phase characteristics of each analog T/R module (also called calibration) is required. Furthermore, the characteristics of these T/R modules can change significantly with the change of temperature (e.g., affected by the solar radiation received). In low-Earth orbit (LEO) satellites, the temperature change is significant even from minute-to-minute. Calibration must, therefore, be simultaneous with transmit/receive digital beam-forming (DBF) processing and this is facilitated by making multiple calibration measurements simultaneously.

The present disclosure relates to obtaining accurate phase calibration estimates in phase arrays, for example with respect to than U.S. patent Ser. No. 10/972,195B1.

As was already stated in U.S. Ser. No. 10/972,195B1, re-calibration of the array is frequent (and that it occurs simultaneously with service). Although removal-from-service of phased-array elements (and using them solely for calibration) does not significantly degrade phased array operation nor do the calibration signals cause significant interference to the beams, minimizing calibration sequence duration can avoid even these minimal degradations. Using OFDM sequences rather than CDMA sequences (used in U.S. Ser. No. 10/972,195B1) can either improve the accuracy of phase calibration, or for a given phase calibration accuracy, use a shorter calibration sequence. The ensuing description demonstrates the superiority of OFDM calibration sequences relative to CDMA.

BRIEF DESCRIPTION OF THE FIGURES

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIG. 3A illustrates default configuration for Tx and Rx beamforming;

FIG. 3B illustrates an example configuration for Tx path calibration;

DETAILED DESCRIPTION

Figure 1:
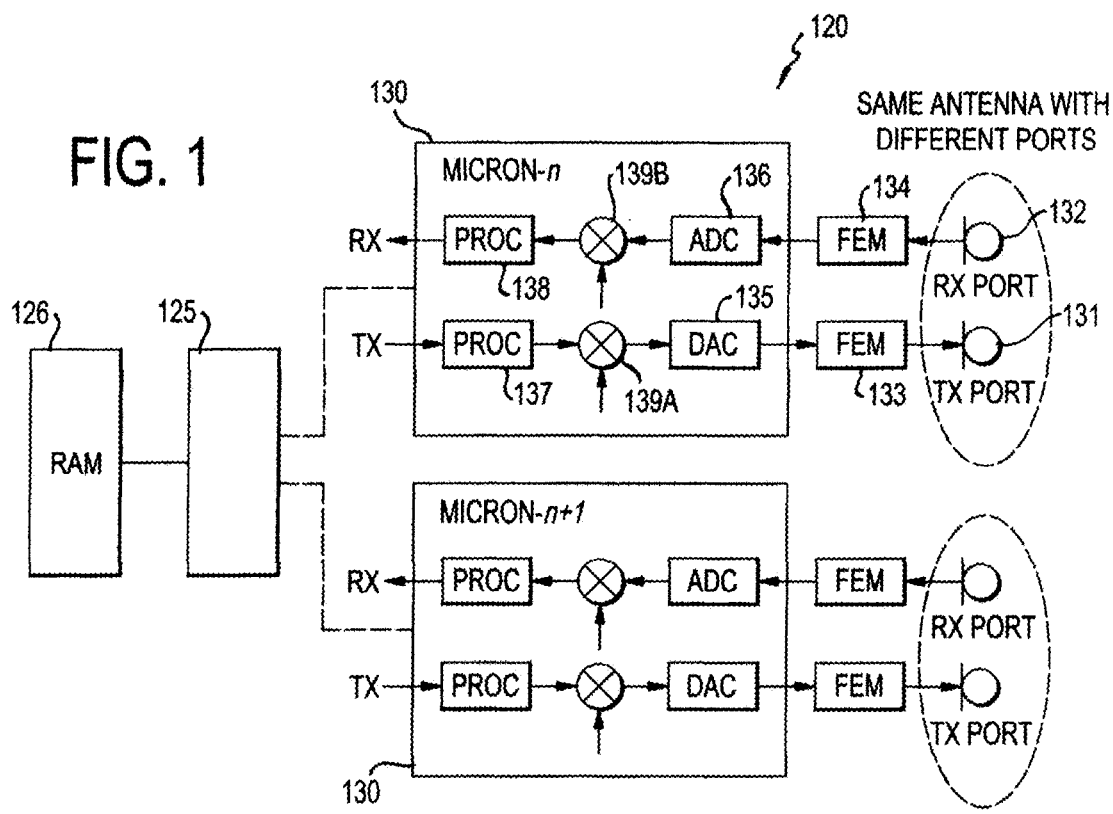
FIG. 1 illustrates an antenna assembly configuration.

In describing the illustrative, non-limiting embodiments of the disclosure illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments of the disclosure are described for illustrative purposes, it being understood that the disclosure may be embodied in other forms not specifically shown in the drawings.

Referring to FIG. 1, an antenna assembly 120, e.g., an antenna assembly or sub-array of a phased array antenna, includes multiple antenna elements 130. Two antenna elements MICRON-n, MICRON-n+1 are illustrated, indicating that any suitable number of antenna elements 130 can be utilized. The antenna assembly 120 can also be referred to as a "Micron." In one embodiment shown in FIG. 1, the antenna assemblies 120 are mechanically and/or electronically linked together to form a single continuous phased array of antenna assemblies 120 that create a large array in space, such as shown in U.S. Pat. No. 9,973,266 and U.S. Publ. No. 2019/0238216.

Each antenna element 130 includes a transmit port (TX port) 131 and a receive port (RX port) 132 as shown in FIG. 1. Each antenna element 130 also includes its own DBF processors 137, 138, mixers 139A and 139B, with the mixing frequency driver numerically controlled oscillators (NCOs), tuned to transmit and receive frequencies respectively, which up/down converts baseband signals to/from a desired band such as an LTE band, a digital-to-analog converter (DAC) 135, an analog-to-digital converter (ADC) 136, and analog front end components, lumped as transmit and receive Front End Modules (FEMs) 133, 134 in FIG. 1. Mixing may include multiplication and filtering (to reject unwanted images).

In one example embodiment, the antenna assemblies 120 can be connected to a central processor via a low-jitter and drift clocked high speed serializer/de-serializer (such as SERDES) for common clock distribution. A central processor (CP) broadcasts beam signals to transmit beam-forming processing 137 and collects accumulated receive beam-forming processed signals (the output of 138) via the SERDES lines. It also periodically updates transmit and receive beamforming taper and phase information, for each beam, as the satellite traverses its orbit. Additionally, it coordinates the calibration process described herein and phased-array monitoring and control (M&C). The beam-forming sub-system (comprised of the central processor and the phase array of antenna assemblies 120) can communicate with a transponder, which in turn communicates, e.g., via satellite, with a ground station antenna. Though a central process is shown, distributed processing can also be provided such as, for example each antenna element 130 having a micro-processor.

For example, the antenna assembly 120 can include a processing device 125 configured to perform (or control) various functions (or processes) of the antenna assembly 120, and a memory device 126 configured to store symbols and/or other suitable data or instructions (such as instructions be executed by the processing device 125).

Transmit 137 and receive 138 digital beam-forming processing devices may be configured to perform, for each beam, multiplying each input signal sample by a taper and phase (determined by the element's location in the phased array) and accumulating the results over the number of beams formed. Finally, the digital data is converted to/from analog data via digital-to-analog converter (DAC, also marked 135) and analog-to-digital converter (ADC, also marked 136). All baseband and RF delays in digital components (including the ADC and DAC) on an antenna assembly 120, as well as neighboring antenna assemblies 120, are tightly controlled/calibrated by the timing of SERDES frames.

Due to phased array structure flexure, the antenna elements 130 in an array 120 can move, but the movements are small, and the position changes are compensated digitally. The local oscillators in each antenna assembly 120 may have a random relative starting phase on power-up or reset. We note that a transmit antenna element can radiate to itself (the self-coupling) and its immediate neighbors (including adjacent and diagonal neighboring elements—eight, if the element is fully surrounded by neighbors, and fewer if an edge element). Its effects on non-immediate neighbor elements simply increases the level of interference present and can be dealt with by increasing the code length of the calibration sequence. To achieve phased array calibration, each coupling phase shift must be estimated or known.

In the foregoing, we measure the phase and logarithm of amplitude difference between the receiving path's digital input and the transmitting path's digital output. These measurements are the sum of the transmit path phase, the self/mutual coupling phase, and the receive path phase, and/or the sum of logarithm of amplitude of the transmit path, logarithm of amplitude of the self/mutual coupling phase, and logarithm of amplitude of the receive path. Multiple such measurements are made until all Tx path phases, Rx path phases and carrier phase differences among antenna assemblies are determined. Further, we measure the logarithm of the amplitude ratio of the receiving path's digital input and the transmitting path's digital output, where the measured logarithm of the amplitude ratio is the sum of the logarithms of the transmit path gain, the self/mutual coupling gain, and the receive path gain. Multiple such measurements are made until all the logarithms of the transmit path gain, the mutual coupling amplitude-response, and receive path gain are determined.

In one example, an antenna of an antenna element 130 may include a transmit port 131 and a receive port 132, and the antenna element 130 may transmit via the transmit port 131 to its own receive port 132. In another example, an antenna element 130 may include a transmit antenna 131 and a receive antenna 132, and the antenna element 130 may transmit via the transmit antenna 131 to its own receive antenna 132. Thus, a self-coupling may be, for example, a coupling between an antenna element 130 and itself, via a transmit port 131 of and a receive port 132 of the same antenna element 130, or via a transmit antenna and a receive antenna of the antenna element 130. A mutual coupling may be, for example, a coupling between a first antenna element 130 and a second antenna element 130 that is adjacent to the first antenna element, via a transmit antenna of the first antenna element and a receive antenna of the second antenna element that is adjacent to the first antenna element.

Calibration may be performed at certain points, for example: when a phased-array or the antenna assembly is power cycled or reset; when the operating frequency changes or about to change; when temperature changes substantially (aided by temperature sensors in the antenna assemblies); and/or when there is aging of electronic components. When calibrations are run frequently, recalibration due to aging is automatic. Calibration may be performed, for example, simultaneously with beamforming, reducing interference and gain-loss. Calibration is scan angle independent; and calibrating one beam may apply to all other beams at same carrier.

Figure 2A:
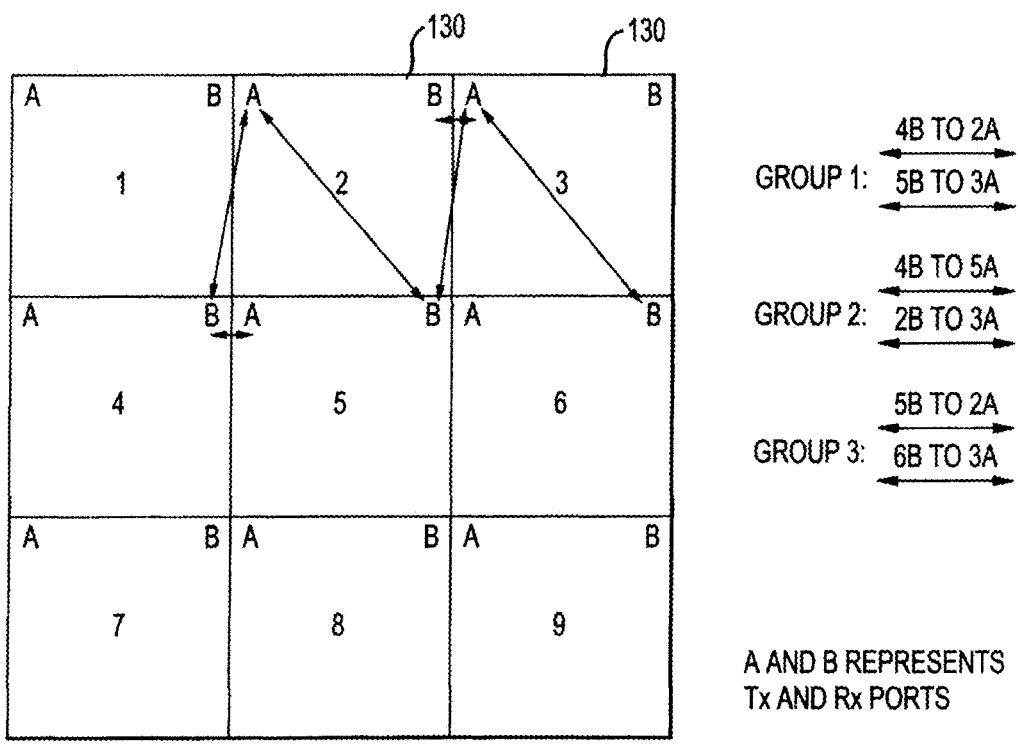
FIG. 2A illustrates a configuration of measurements in 3×3 elements in an antenna assembly.
Figure 2B:
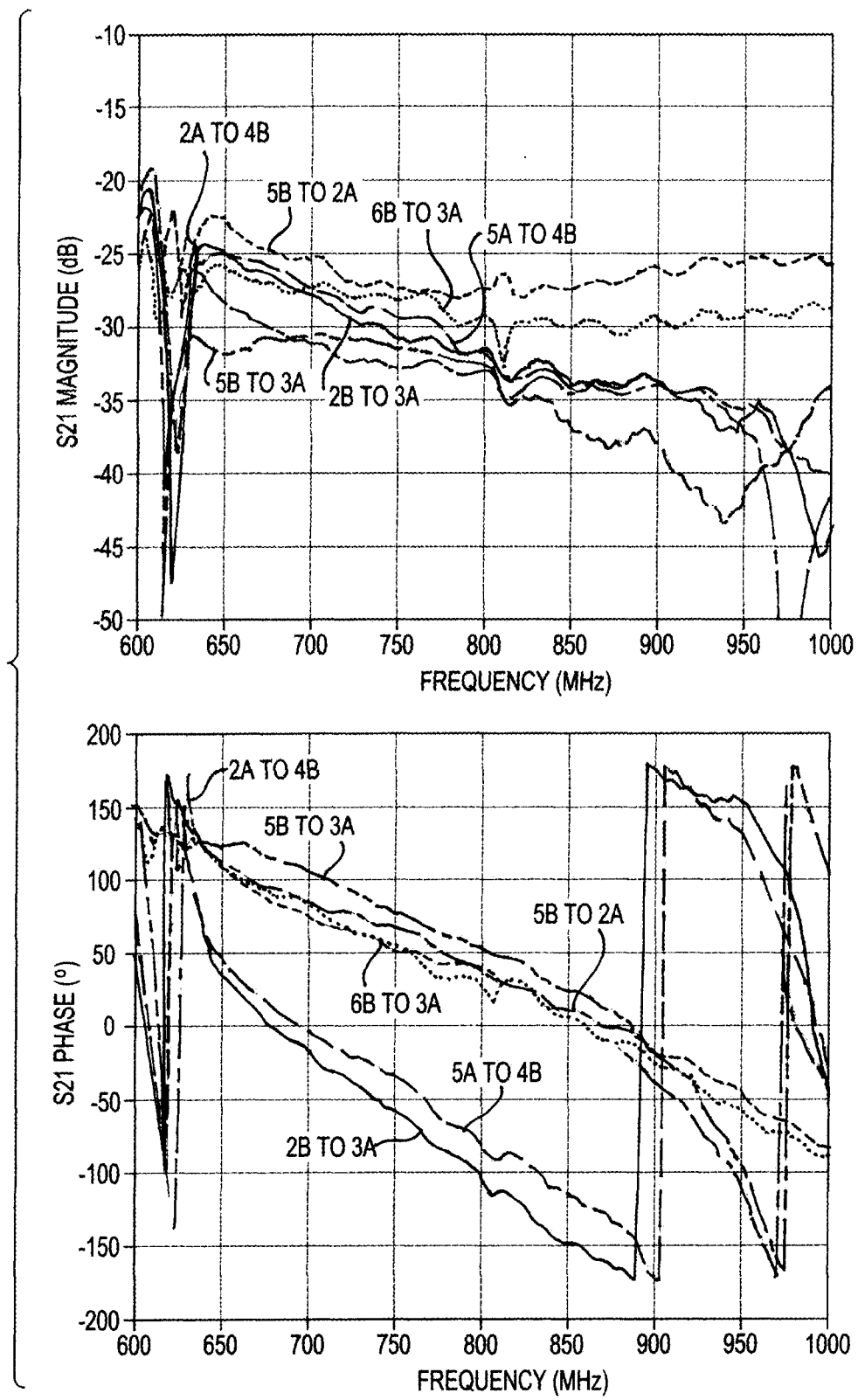
FIG. 2B illustrates mutual coupling amplitude and phase measurements for above sample configurations.

Sample measurements (FIGS. 2A and 2B) show that mutual coupling measurements are very similar for a group with same transmit path to receive path directions (which we can designate by the familiar cardinal directions, N, NE, E, SE, S, SW, W, and NW). In general, for example, the N mutual coupling could be quite different from the NE mutual coupling. In fact, all these are quite different from each other. However, the NE mutual coupling of one element is similar to the NE or another So, a set of mutual coupling measurements in the 8 cardinal directions in the adjacent and diagonal directions may be measured and stored for use later during Tx path and Rx path phase and amplitude calibration estimation (provided these do not materially change with temperature/aging). The 8 cardinal directions may include, for example, 4 adjacent directions and 4 diagonal directions. For example, for element 5, 4 adjacent directions may include a direction from element 5 to element 6, a direction from element 5 to element 4, a direction from element 5 to element 2, and a direction from element 5 to element 8; and 4 diagonal directions may include a direction from element 5 to element 1, a direction from element 5 to element 3, a direction from element 5 to element 7, and a direction from element 5 to element 9. In FIG. 2A, for each element, A represents a Tx port of the element, and B represents a Rx port of the element. For example, 5A represents a Tx port of element 5, and 5B represents a Rx port of element 5. In FIG. 2A, the double-arrow line between 5B and 3A, i.e., the double-arrow line labeled with "5B to 3A," represents a mutual coupling measurement for the coupling between a Rx port of element 5 and a Tx port of element 3. In FIG. 2B, a curve labeled with "5B to 3A" is a curve for a mutual coupling measurement for the coupling between a Rx port of element 5 and a Tx port of element 3. A mutual coupling measurement may include, for example, a mutual coupling amplitude measurement or a mutual coupling phase measurement. Mutual coupling amplitude and phase can be direction dependent. The transmit/receive FEM amplitude and phase can be very different from element-to-element and uncorrelated with the directions they receive signals from, and that are calibrated (or equalized).

FIG. 3A shows default configuration for Tx and Rx beamforming. To enable measurements, a signal (CAL), 319 in FIG. 3A, such as a tone, pseudo-noise (PN) code, or OFDM calibration sequence may be sent by the transmitter to its digital-to-analog converter DAC. A PN code may be, for example, a binary sequence with two-valued autocorrelation. With the aid of self/mutual coupling to self/adjacent element receive paths, the phase/amplitude measurements are taken in self/adjacent elements. That is, with the aid of self-coupling to self-element receive paths, the phase/amplitude measurements are taken and with the aid of mutual coupling to adjacent element receive path, the phase/amplitude measurements are taken in a neighbor element. Averaging of measurements from multiple adjacent elements reduces the estimation error.

TABLE 1

Tone vs PN vs OFDM sequence CAL signal

| Tone | PN sequence | OFDM sequence |
|---|---|---|
| Short averaging time for measurements | Much longer averaging time for measurements | Shorter averaging time measurements. Can be combined with orthogonal CDMA codes for cancelling inter-element interference in Tx array element calibration. High MAX resolvable delay measurement range. Very simple processing implementation (low processing power) |
| Potentially interferes with some LTE sub-carriers | Low enough signal that negligibly interferes with LTE signals ($2^N$-1 PN sequence provides about ~6NdB SNR gain at detector) Requires MAX delay to be within +/−1 a chip period. Requires delay differences across multiple calibrating Tx elements being << the chip period. | High PAPR; however, this can be minimized or reduced by precomputing (off-line) low PAPR sequences. |

Multiple tones/Gold codes/orthogonal-frequency-division-multiplexing (OFDM) signals may be used to excite calibration signal from adjacent elements in different antenna assemblies, to avoid interference in measurements. Nine (9) codes are enough to allow simultaneous transmission from neighboring antenna elements, including its own antenna element. Amplitude calibration is unaffected by phase shifts when a constant envelope CAL signal is used (such as tones/Gold codes). OFDM sequences on the other hand can exhibit high peak-to-average-power-ratio (PAPR). This feature can potentially introduce Inter-Modulation (IMD) noise due to non-linear RF components (e.g., the power amplifier). However, in practice this effect is limited because a) The calibration signals are transmitted with significant power back off, b) The PAPR can be minimized by pre-computing (off-line) OFDM calibration sequences with low PAPR. As an example, finding a 2048 sub-carrier binary phase-shift keying (BPSK)-OFDM symbol with PAPR=6.8 dB, required 10 million randomized (with respect to the BPSK symbol sequence) searches.

Configuration for Different Operating Modes

Figure 3C:
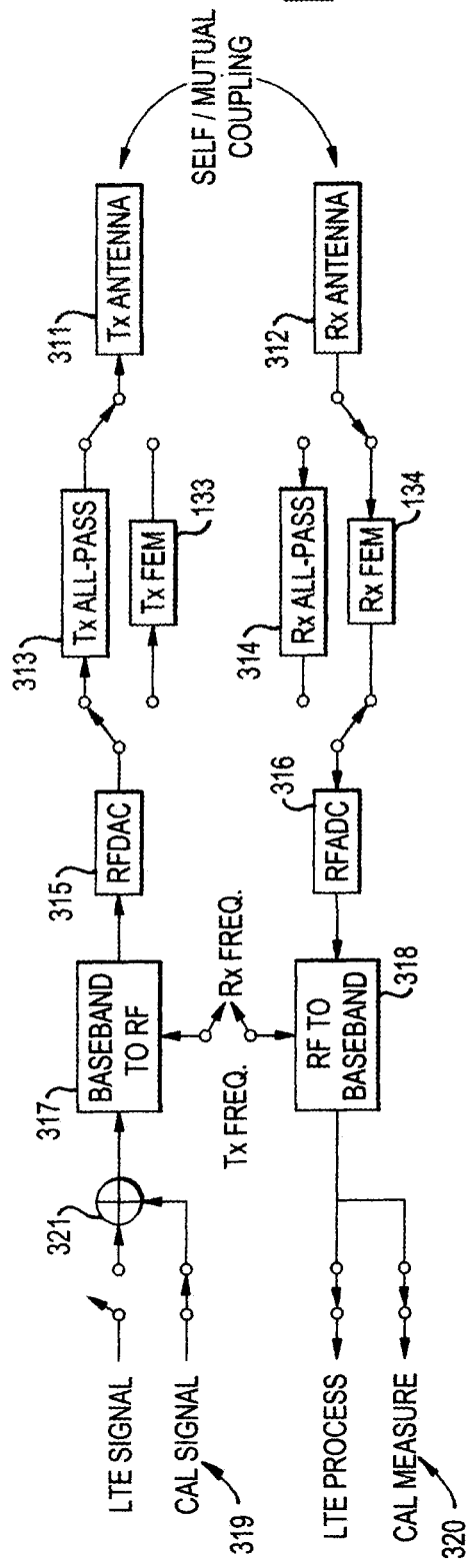
FIG. 3C illustrates an example configuration for Rx path calibration.

Example configurations are shown by switch settings for different operating modes in FIG. 3A-3C. FIG. 3A shows transmit/receive (Tx/Rx) beamforming, which is the default mode of operation. Here, only Tx and Rx beamforming are done, and calibration measurements do not occur.

Referring to FIG. 3A, during the Tx/Rx beamforming, a beamformed signal, e.g., LTE signal, is provided to the baseband-to-RF NCO 317 via an adder circuit 321 without adding CAL signal 319, and the baseband-to-RF NCO 317 is tuned to the Tx Frequency. The baseband-to-RF NCO 317 converts the LTE signal and outputs a signal to a radio-frequency digital-to-analog converter (RFDAC) 315. The signal outputted from the baseband-to-RF NCO 317 is converted into an analog signal by the RFDAC 315. Tx FEM 133 is selected to pass the analog signal to the Tx Antenna 311. The Tx antenna 311 leaks into the analog signal to Rx antenna 312 (via self/mutual coupling), but is suppressed by the Rx FEM. The Rx antenna 312 may receive the analog signal. Rx FEM 134 is selected to pass the analog signal to a radio-frequency analog-to-digital converter (RFADC) 316. The RFADC 316 converts the analog signal into a digital signal. The digital signal is further provided to an RF-to-baseband NCO 318. The RF-to-baseband NCO 318 is tuned to Rx Frequency, and converts the inputted digital signal and output a signal for LTE process. Accordingly, the system is able to calibrate in FDD where the transmit and receive frequencies (and FEMs) are different.

FIG. 3B shows an example configuration for simultaneous Tx beamformer and Tx path calibration. In one example configuration, the calibration signal (CAL signal) 319 is introduced to characterize the element's Tx FEM's amplitude and phase response. The calibration signal may be a tone or a bi-phase (PN) sequence/Gold code or an OFDM signal. The calibration signal 319 is added to the beamformed signal (e.g., LTE signal) by the adder circuit 321; as a result, the output signal includes the transmit beamformed signal and the calibration signal. Tx FEM 133 is selected to allow transmit carrier frequency bands to be transmitted. Self and adjacent Tx paths, that require calibration, transmit calibration signal each with a different code. The Rx path of the element 5 central to the 9 elements (see, e.g., FIG. 2A), momentarily pause the Rx beamforming, switch from the Rx FEM 134 to Rx-all-pass path 314 (i.e., bypassing the Rx FEM 134), where Rx all-pass path 314 allows both transmit and receive carrier frequency bands to be received. The RF to baseband NCO 318 is tuned to the Tx Frequency such that calibration measurement 320 may be made for Tx calibration. In one example, 9 different codes (1 from self and 8 from adjacent elements) may be simultaneously used so that the transmit FEMs of the self and neighboring elements can be calibrated with respect to the same Rx all-pass path 314 of the central element, which is common reference for all these 9 measurements.

FIG. 3C shows, for RX FEM calibration, that the LTE signal from the DBF processor is temporarily (until this calibration measurement is completed) switched-off, the baseband-to-RF NCO 317 is tuned to the Rx frequency to allow calibration signal generation at Rx frequency, the Tx FEM 133 is bypassed by selecting the Tx-all-pass path 313, and the Rx FEM 134 is activated (as normal), and both Rx beamforming and the Rx calibration measurement 320 are enabled. The calibration signal 319 from the central element, such as element 5 in FIG. 2A, (with Tx FEM 133 bypassed) is received through the Rx FEMs 134 of the self and adjacent elements, so that the Rx FEMs of the self and neighboring elements can be calibrated simultaneously with respect to the same Tx all-pass path 313 of the central element which is the common reference for all these 9 measurements. In one example, unlike the Tx FEM calibration case, Rx FEM calibration may use only one calibration (tone or PN code or OFDM) signal (for transmission to the RXFEMs of neighboring elements).

According, Tx/Rx calibration can be achieved for FDD systems; up to 9 calibration sequences (per Micron) can be transmitted simultaneously in TXCAL mode, provided the cross-correlation of these codes are small, with 9 simultaneous correlations at one element; only one calibration sequence is need in Rx; however, the 9 correlators are implemented in different elements; the calibration sequences can have low power (relative to the beamforming signal) by increasing the length of the code; elements in different microns can have calibration measurements in parallel; in the case of 5, elements carrying calibration signals have to be pseudo-randomly selected to avoid sidelobes; and the codes themselves have to be phased differently in different Microns in order to avoid the calibration signal interfering with the beam signals.

Figure 4:
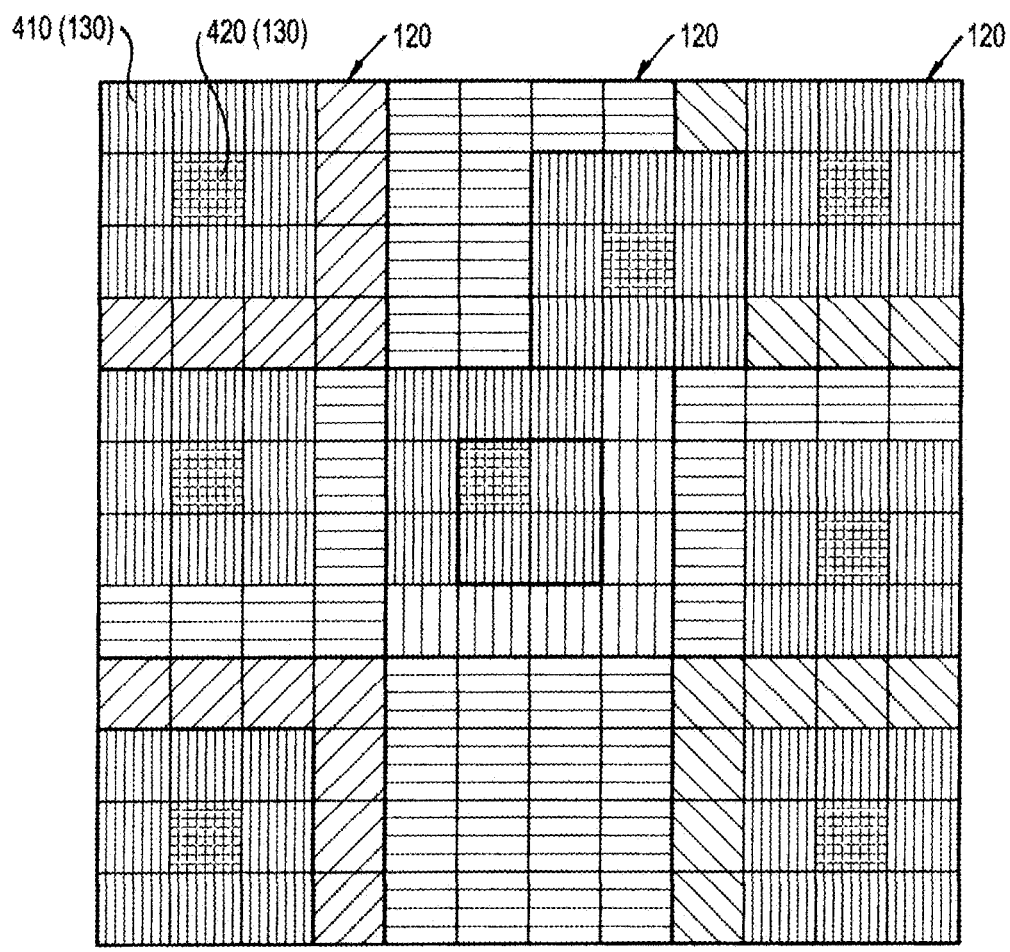
FIG. 4 illustrates an example configuration of elements in antenna assemblies during calibration.

FIG. 4 shows the example configurations for which the self and mutual coupling measurements are made on the ground and used on-board during calibration measurements. Referring to FIG. 4, 3×3 antenna assemblies 120 are shown, and each antenna assembly 120 may include a plurality of elements 130 (here, further designated as first and second elements, 410, 420). The second element 420 may be selected as a possible central element. Each antenna assembly 120 may include, for example, a group of 4×4 elements. Central elements in different antenna assemblies 120 can be calibrated in parallel (e.g., the term "parallel" as used throughout this disclosure includes simultaneous), provided they do not have neighboring antenna elements that are common. One way to ensure this is to calibrate alternate antenna assemblies (in checkerboard style in parallel).

Phase/logarithmic amplitude measurement is the sum of Tx path phase/logarithmic amplitude, the self/mutual coupling phase/logarithmic amplitude, and the Rx path phase/logarithmic amplitude. That is, phase measurement is sum of Tx path phase, the self/mutual coupling phase, and the Rx path phase; and logarithmic amplitude measurement is sum of Tx logarithmic amplitude, the self/mutual logarithmic amplitude, and the Rx path logarithmic amplitude.

Referring to FIG. 4, in transmit calibration, the first antenna element 410 is transmitting while the second antenna element 420 is the common Rx path (with all-pass path to allow CAL signal at transmit frequency to be received in Rx path). In receive calibration, element 410 is receiving while element 420 is the common Tx path (with all-pass path to allow CAL signal at receive frequency to be transmitted in Tx path). After all intra-antenna assembly calibration measurements are aligned, inter-antenna assembly measurements are reconciled.

Thus, FIG. 4 shows 9 antenna assemblies of 4×4 antenna elements. One snapshot of the antenna elements (the selected 9 out of 16) participating in the intra- and inter-Micron calibration measurements happening in each antenna assembly. The measurement is treated as intra-Micron if the selected 9 antenna elements are within the antenna assembly. The measurement is treated as inter-Micron if the selected 9 antenna elements spans 2 adjacent antenna assemblies. In each antenna assembly, while taking calibration measurements, one of the antenna elements acts as a central element 420 (common Rx path during transmit calibration and common Tx path during receive calibration), and all elements surrounding the central element 420 is treated as a second element 410 that surrounds the central element 420. Once the measurements of the 9 elements is taken with reference to the common path, it is moved to a different position until the measurements of all antenna elements are covered. In the embodiment shown, the middle bottom set is not making any calibration measurements at that particular time. In the top middle, some of the surrounding elements 410 extend into the next set (to the right in the embodiment shown), which reflects an inter-Micron measurement, to align the measurements of one antenna assembly with the measurements of the adjacent antenna assembly. Thus, the system obtains calibration measurements from multiple elements simultaneously.

OFDM Calibration Signal Design

The transmitted OFDM calibration signal is designed as follows.

Figure 5:
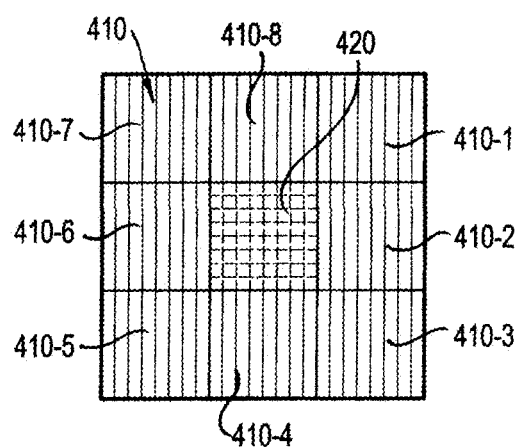
FIG. 5 illustrates the first antenna element surrounding the second antenna element 420 performing calibration between them.

Referring to FIG. 5, in transmit calibration, the first antenna element 410 is transmitting and thus a actively transmitting calibration element, while the second antenna element 420 is the common Rx path (with all-pass path to allow CAL signal at transmit frequency to be received in Rx path). A different (or unique) BPSK-OFDM (or QAM-OFDM) symbol without Cyclic Prefix (CP) may be assigned to each actively transmitting calibration element, where the different BPSK-OFDM or QAM-OFDM symbols may have low mutual cross-correlation, and/or may be generated using randomised BPSK symbols.

Figure 6:
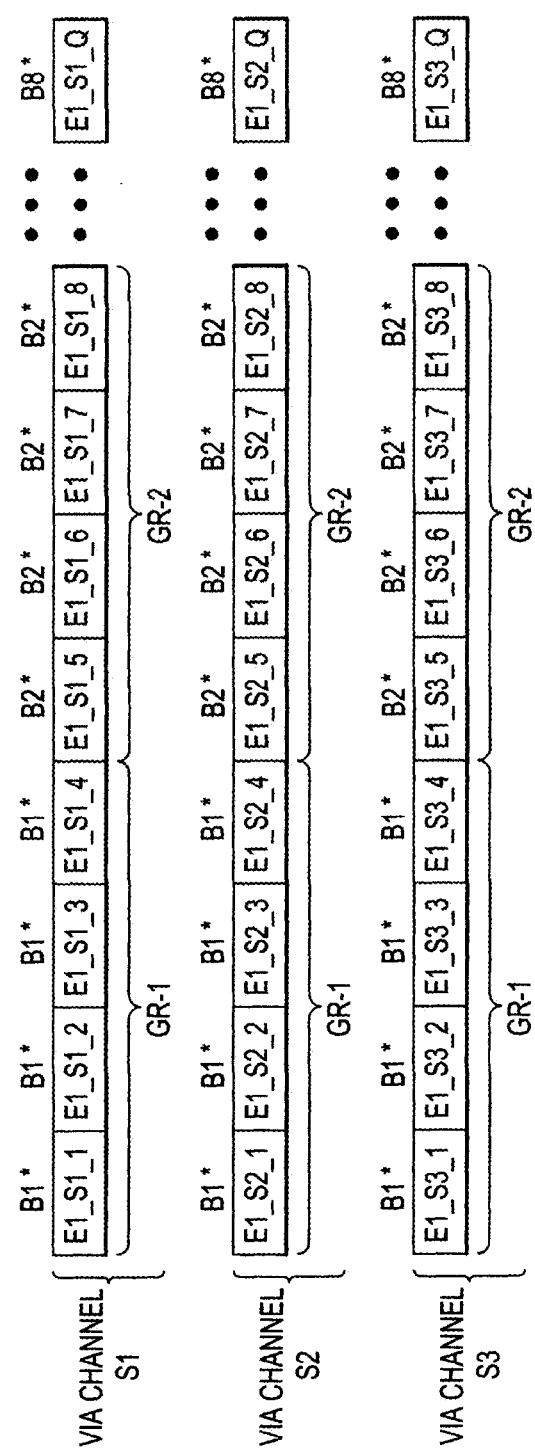
FIG. 6 illustrates grouping and modulating time-domain OFDM symbols.

In an example scenario that there are three active LTE carriers (C1, C2, C3), then there can be three channels (channel S1, channel S2, channel S3) for transmitting OFDM symbols, where channel S1 corresponds to active LTE carrier C1, channel S2 corresponds to active LTE carrier C2, and channel S3 corresponds to active LTE carrier C3. The number of active LTE carriers can be another suitable value (such as an integer greater than three), and an individual active LTE carrier corresponds to a channel. Referring to FIG. 6, for the transmitting calibration element 410-1, there can be, for example, three channels (channel S1, channel S2, channel S3) for transmitting OFDM symbols (if the number of active LTE carriers is three). For the transmitting calibration element 410-1, the first channel S1 can have OFDM symbols E1_S1_1, E1_S1_2, . . . , to E1_S1_Q, where Q is the number (e.g., total number) of OFDM symbols of the first channel S1 of the transmitting calibration element 410-1, and "E1" in the symbol reference number indicates the symbol corresponds to the first transmitting calibration element 410-1, and "S1" in the symbol reference number indicates the symbol corresponds to the first channel S1. The OFDM symbols of first channel S1 of the transmitting calibration element 410-1 can also be expressed as {E1_S1_$q$|q is an integer in a range from 1 to Q}. The OFDM symbols E1_S1_1, E1_S1_2, . . . , to E1_S1_Q are the same OFDM symbol repeated many times. The OFDM symbols E1_S1_1, E1_S1_2, . . . , to E1_S1_Q can be grouped (in equal groups), as shown in FIG. 6. Groups of OFDM symbols can be modulated by the respective bit of an orthogonal (BPSK) code that is used for the transmitting calibration element 410-1.

The second channel S2 of the transmitting calibration element 410-1 can have OFDM symbols E1_S2_1, E1_S2_2, . . . , to E1_S2_Q, where Q is the number (e.g., total number) of OFDM symbols of the second channel S2 of the transmitting calibration element 410-1, and "E1" in the symbol reference number indicates the symbol corresponds to the first transmitting calibration element 410-1, and "S2" in the symbol reference number indicates the symbol corresponds to the second channel S2. The OFDM symbols of second channel S2 of the transmitting calibration element 410-1 can also be expressed as {E1_S2_$q$|q is an integer in a range from 1 to Q}. Similarly, the OFDM symbols of third channel S3 of the transmitting calibration element 410-1 can be expressed as {E1_S3_$q$|q is an integer in a range from 1 to Q}

Thus, for transmitting calibration element 410-$p$, where index p is an integer in a range from 1 to the number (e.g., total number) P of transmitting calibration elements, the j-th channel (channel Sj) has OFDM symbols {Ep_Sj_q|q is an integer in a range from 1 to Q}, i.e., Ep_Sj_1, Ep_Sj_2, . . . , to Ep_Sj_Q. The index j is an integer in a range from 1 to J, where J is the number (e.g., total number of) of channels for transmitting symbols for a respective transmitting calibration element.

Figure 9:
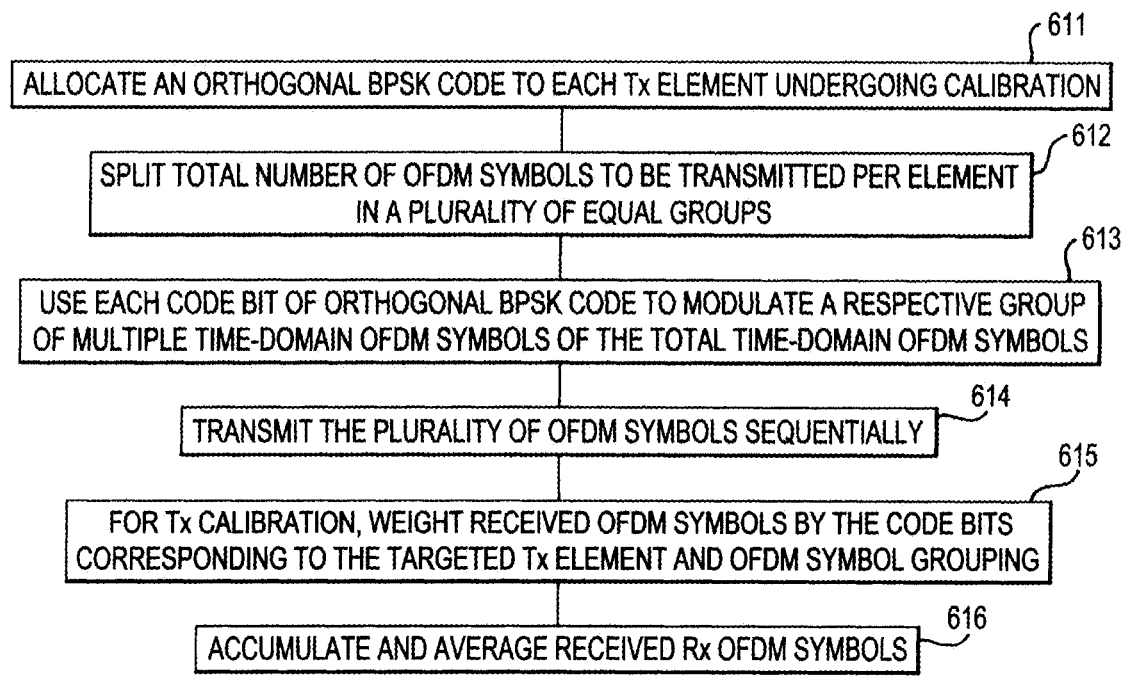
FIG. 9 illustrates an example method of orthogonalizing the calibrating signals by orthogonal BPSK codes and using OFDM symbols for calibration.

During Tx calibration, there are multiple active transmitting calibration elements (such as elements 410-1 to 410-8 operating as eight active transmitting calibration elements), which causes cross-interference in the Rx element 420. The calibrating signals may be orthogonalized, to reduce the cross-interference due to the multiple active transmitting calibration elements. In some examples, the calibrating signals may be orthogonalized through OFDM sub-carrier allocation. Accordingly, OFDM orthogonality with respect to sub-carrier frequencies is introduced, and there is no cross sub-carrier interference. In another example, the calibrating signals may be orthogonalized through binary orthogonal code modulation on groups of OFDM symbols. With the use of binary orthogonal codes, a CDMA code is applied on (groups of) OFDM symbols in the time domain (i.e., after IFFT). This introduces an orthogonality in the time domain, which is used for reducing interference across active transmitting calibration elements. After being orthogonalized by binary orthogonal code modulation, the calibration signals across all active transmitting calibration (e.g., eight) elements will be mutually orthogonal in the CDMA sense. FIG. 9 illustrates an example method of orthogonalizing the calibrating signals by binary orthogonal code modulation on groups of OFDM symbols and using OFDM symbols for calibration, which is further described below.

In the example of eight Tx actively calibrating elements, an orthogonal BPSK code (i.e., orthogonal CDMA codes) of length 8 is allocated to each Tx element undergoing calibration (Step 611 of FIG. 9), where the length of the orthogonal BPSK code is the number (X) of bits in the orthogonal BPSK code. The length of the orthogonal BPSK code is chosen to be adequate so as to bound the group delay, phase and amplitude errors adequately, and needs to be equal to or greater to the number of Tx elements undergoing calibration. Accordingly, eight Tx actively calibrating elements can have eight orthogonal BPSK codes. The time-domain OFDM symbols in each group is multiplied by the value (+/−1) of the corresponding code bit, and accordingly modulated by the corresponding code bit. In the example of FIG. 6, the four time-domain OFDM symbols E1_S1_2, E1_S1_3, and E1_S1_4, are in a same group and are each modulated by the corresponding code bit B1. BPSK code can be longer if more active Tx elements are used.

Split total number of OFDM symbols to be transmitted per element in a plurality of (such as 8) equal groups (Step 612). Referring to FIG. 6 and Step 612, the total time-domain OFDM symbols per transmitting element are split (or divided) into multiple groups, where the number of groups is equal to the number (X) of bits in the respective orthogonal BPSK code, and each code bit (such as B1, B2, B3, . . . , B8) covers (e.g., modulates) a respective group of multiple time-domain OFDM symbols (such as E1_S1_1, E1_S1_2, E1_S1_3, E1_S1_4 of channel S1) of the total time-domain OFDM symbols (such as E1_S1_1 to E1_S1_Q of channel S1) transmitted on a given transmitting element. The total time-domain OFDM symbols per transmitting element is divided into X groups of time-domain OFDM symbols, where X is number of bits in the orthogonal BPSK code.

Multiply each of the plurality of (such as 8) groups of OFDM symbols by the corresponding code bit (Step 613). Referring to FIG. 6 and FIG. 9, each individual code bit of orthogonal BPSK code is used to modulate a respective group of multiple time-domain OFDM symbols of the total time-domain OFDM symbols. In the example of FIG. 6, for channel S1, code bit B1 is used to modulate a first group (GR-1) of time-domain OFDM symbols E1_S1_1, E1_S1_2, E1_S1_3, E1_S1_4, and code bit B2 is used to modulate a second group (GR-2) of time-domain OFDM symbols E1_S1_5, E1_S1_6, E1_S1_7, E1_S1_8, and so on. For example, time-domain OFDM symbol E1_S1_2 is modulated by B1, and converted into B1*E1_S1_2, and time-domain OFDM symbol E1_S1_5 is modulated by B2, and converted into B2*E1_S1_5.

The same or similar processes of grouping (such as Step 612) and/or modulating (such as Step 613) can be performed in parallel for the three channels (S1, S2, S3) corresponding to three active LTE carriers (C1, C2, C3), where the same orthogonal code can be used to modulate symbols of the three channels (S1, S2, S3), also shown in FIG. 6, because the three active LTE carriers (C1, C2, C3) are separated in frequency. The same or similar processes of grouping (such as Step 612) and/or modulating (such as Step 613) can be performed in parallel for the eight Tx actively calibrating elements, using a different code for each calibrating element. The different BPSK codes for multiple calibrating elements are orthogonal to each other across the multiple calibrating elements.

Referring to Step 614 and FIG. 6, transmit the plurality of OFDM symbols sequentially. Although there can be a gap of one OFDM symbol period between adjacent groups, such a gap of one OFDM symbol period is not necessary if the receiver skips the OFDM symbols on both sides of the group boundaries. The plurality of OFDM symbols are transmitted sequentially (i.e. one after another in the time domain).

If the LTE carriers have different bandwidths, and if the calibration signal bandwidths need to match the respective LTE carrier bandwidths, unique BPSK-OFDM symbols with different bandwidths can be chosen to match the respective LTE carriers, such that each BPSK-OFDM symbol has the same bandwidth of the respective LTE carrier. The BPSK-OFDM symbol a symbol resulted from OFDM symbol being modulated by the respective code bit. For example, BPSK-OFDM symbol B1*E1_S1_2 is a symbol resulted from OFDM symbol E1_S1_2 being modulated by the respective code bit B1.

These unique OFDM symbols (e.g., BPSK-OFDM symbols) can be pre-computed and stored in a memory device (such as memory device 126 in FIG. 1), e.g., directly as time-domain samples or as BPSK sequences which are or can be IFFT- (inverse fast Fourier transform-) processed by a processing device (such as processing device 125 in FIG. 1). The processing device 125 may be, for example, a microprocessor. The memory device 126 may be, for example, a random-access memory (RAM).

The unique BPSK-OFDM symbols can be selected or determined via randomized simulations (or other methods) for having low PAPR.

For example, finding symbols with ~7 dB PAPR via randomized simulations is realistic in terms of simulation times.

For each active LTE carrier, the corresponding calibration signal is generated by repeating many times the unique BPSK-OFDM symbol.

The number of times the symbol is repeated depends on the processing gain (noise averaging) that is required for meeting the calibration performance targets. For example, averaging is performed or repeated to meet the calibration signal detection (in terms of phase, amplitude, or timing accuracy).

In some examples, the OFDM symbol may need to be repeated three times or more, since the first and last OFDM symbols are discarded in the received signal processing.

Figure 7:
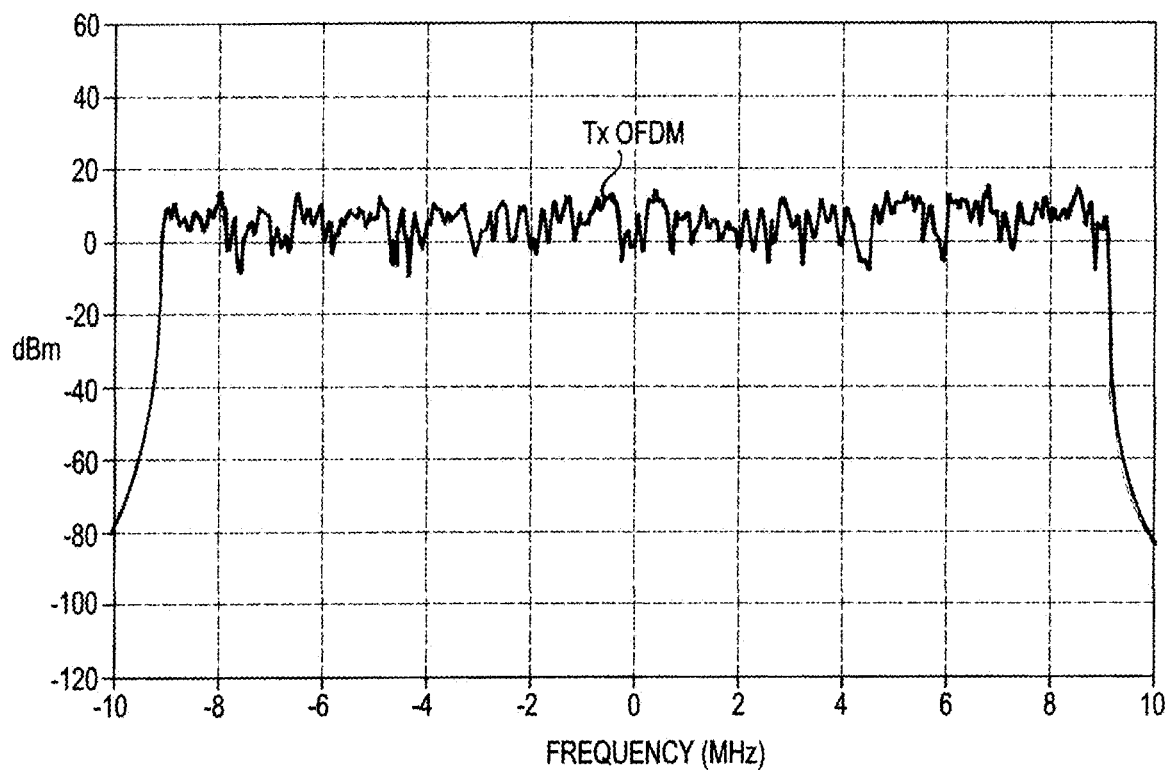
FIG. 7 illustrates an example spectrum of calibration signal for 20 MHz bandwidth.

FIG. 7 illustrates an example spectrum of calibration signal for 20 MHz bandwidth. For example, the example spectrum of calibration signal may have or be configured to correspond to:

Fs (sampling frequency)=20 Msps
IFFT Points N-IFFT=2048
Active Carriers=1843 (90%)
Modulation=BPSK (simulation-optimised sequence for low PAPR)
Symbol Time=0.1024 ms
Sub-carrier Spacing=9.765 KHz
Maximum resolvable Delay=0.1024 ms In some examples, the maximum resolvable delay is equal to 1/(Sub-carrier Spacing). In certain examples, a maximum resolvable delay of ~100 us is possible. If the expected maximum delays (excluding fixed known delays in the digital path) are shorter, then smaller FFT lengths can be used, which is more efficient in terms of resources and power. In certain examples, bandwidth utilisation of the spectrum of calibration signal for 20 MHz bandwidth may be about 90%, and accordingly active bandwidth is about 18 MHz.

Figure 8:
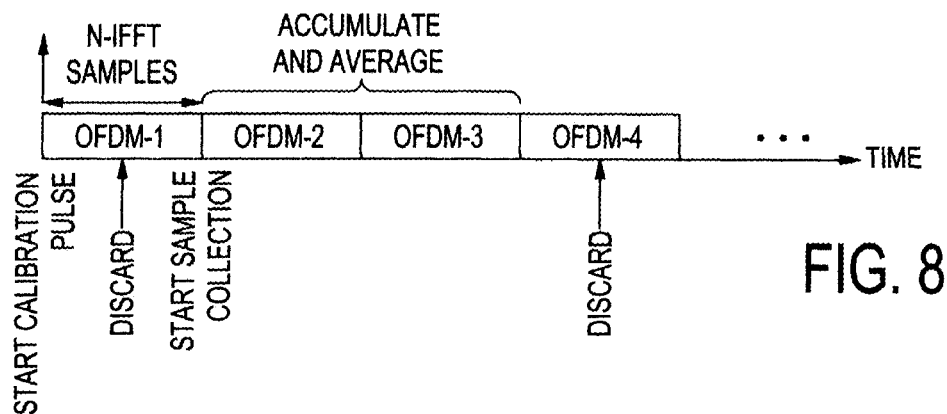
FIG. 8 shows the receiver collection of samples according to one example.

FIG. 8 illustrates sample collection in a receiving element according to one example. It is assumed that the Rx element (such as 420) can has time reference to the start of calibration pulse used by the Tx element(s) (possibly within a known integer delay on the inter-Micron synchronous 20 MHz clock domain). From the detection of calibration start pulse plus known delay offsets), the Rx element (for each active LTE carrier data stream) starts collecting samples after discarding the first N-IFFT samples in the 20 Msps domain.

Real-time processing in the Rx element (such as 420) includes time accumulating and averaging received Rx OFDM symbols in a memory device (e.g., RAM). For each actively transmitting calibration element and each channel, the received OFDM symbols by the Rx element include the OFDM symbols that have been transmitted, but for time accumulating and averaging, the OFDM symbols on the edges of OFDM symbol groups are excluded or discarded. For example, if there are transmitted 800 OFDM symbols in 8 groups, and each group has 100 OFDM symbols, the receiver may discard the first and last OFDM symbols in each group, accordingly, (100−2)*8=784 OFDM symbols may be accumulated and averaged. In the examples of Tx calibration and the element 420 operating as Rx element, accumulating and averaging can be performed in or by element 420.

Referring to FIG. 8, the Rx element may be configured to (for each active LTE carrier data stream) start collecting samples after skipping one OFDM symbol period relative to the initiation of the calibration process, and thus discard the first OFDM symbol (OFDM-1) corresponding to the first N-IFFT samples. The Rx element may be configured to discard the first and last OFDM symbols in each group (e.g., OFDM-1 and OFDM-4 of the first group in the example of FIG. 8), and accumulate and average the remaining OFDM symbols (e.g., including OFDM-2 and OFDM-3 shown in the example of FIG. 8) other than the discarded first and last OFDM symbol in each group (Step 616). In the example of FIG. 8, one group has four OFDM symbols. However, the number of OFDM symbols in a group can be other suitable value, such as a value greater than four.

Such time domain averaging is intended to give the required processing gain for meeting the calibration performance targets. However, its effectiveness relies on the following assumptions. (1) There is no residual carrier frequency offset (CFO) or nearly zero residual CFO in the Rx baseband signal, e.g., the received signal has been down-converted to exactly 0 Hz. This is important since residual CFOs create time-varying phase shifts in the baseband samples, and this leads to non-coherent sample averaging. Because of the very long integration times (several seconds), even very small CFOs can degrade drastically the performance of the technique.

(2) There is no residual sampling frequency offset (SFO) in the Rx baseband signal, i.e., there are 0 ppm offsets and 0 Hz inaccuracies in the Tx DAC and Rx ADC clock frequencies. Apart from time-varying phase shifts, SFO also results in time drifts in the sample collection.

(3) Parameters to be estimated (delay, gain, phase) remain constant over the sample averaging period.

Assumptions (2) and (3) can be satisfied by using a common clock source for all Tx and Rx elements in the array.

For Tx calibration, the Rx element may also be configured to weight received OFDM symbols by the appropriate code bit corresponding to the targeted Tx element and OFDM symbol grouping (Step 615). For example, the received OFDM symbols (which is a combination of OFDM symbols from the plurality of (e.g., 8) Tx elements) may be multiplied with the code bits of the orthogonal BPSK code corresponding to the Tx actively calibrating element we want to isolate, and accordingly the OFDM symbols for the Tx actively calibrating element can be isolated from other Tx actively calibrating element. The multiplication for weighting the OFDM symbols is applied in a similar way as when the code is applied on the OFDM symbols at the step of using each code bit of orthogonal BPSK code to modulate a respective group of multiple time-domain OFDM symbols (as shown in Step 613). By accumulating and averaging (see Step 616) these code-weighted received OFDM symbols into a memory device (such as a RAM), cross-interference can be suppressed due to the code-weighted received OFDM symbols.

For Tx calibration, when accumulating and averaging received Rx OFDM symbols (Step 615), OFDM symbols on either sides of the boundaries between OFDM symbol groupings are discarded, to prevent cross and inter-symbol interference.

Provided assumptions 1-3 are satisfied then interference between the multiple Tx calibrating elements will be cancelled. In principle this interference cancellation scheme can be extended to more than 8 Tx elements by using longer orthogonal codes.

The above-described receiver (Rx) real-time processing allows for a low resource and low power implementation. In the examples of calibrating all 8 Tx elements and 3 LTE carriers in parallel, it can be performed by using, e.g., ×8 (Tx/Rx elements)×3 (LTE carriers)=24 RAM blocks and associated 'Read-Add-Write' processing units for accumulating samples into the RAM blocks.

Efficiencies of approaches (area vs. power trade-offs) for sharing these resources between the array elements are subject to an implementation specific investigation. Given that this processing will be taking place in the 20 Msps domain, it is expected that its power consumption will be compensated by disabling the single idle Tx/Rx digital beamformer during Rx/Tx calibration.

Figure 10:
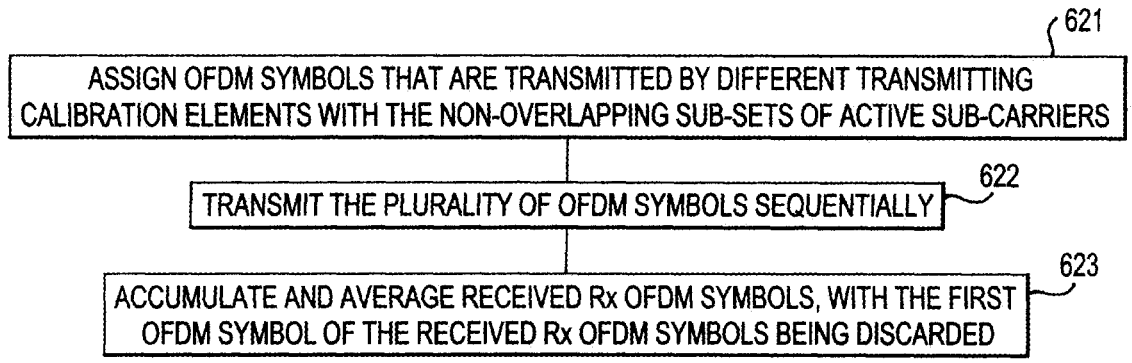
FIG. 10 illustrates an example method of orthogonalizing the calibrating signals by OFDM sub-carrier allocation and using OFDM symbols for calibration.

FIG. 10 illustrates an example method of orthogonalizing the calibrating signals by OFDM sub-carrier allocation and using OFDM symbols for calibration. In the example of using OFDM sub-carrier allocation to orthogonalize calibrating signals, calibrating signals for multiple active transmitting calibration elements (such as elements 410-1 to 410-8 operating as eight active transmitting calibration elements) may be orthogonalized by the OFDM sub-carrier allocation, to reduce the cross-interference across multiple active transmitting calibration elements. For example, each active LTE carrier (such as C1) are divided into multiple non-overlapping sub-sets of active sub-carriers. Prototype OFDM symbols (which are then repeated many times) that are transmitted by different transmitting calibration elements, are constructed so that they are assigned with (or use) the non-overlapping sub-sets of active sub-carriers, such that the calibrating signals are orthogonalized for multiple transmitting calibration elements (Step 621 of FIG. 10). For example, for calibrating 20 MHz channel, if 1843 active sub-carriers are used and if there are 8 Tx calibration elements, these 1843 sub-carriers can be split as evenly as possible between the 8 Tx calibration elements. So OFDM symbols transmitted by the first Tx calibration element (410-1) may use round(1843/8)=230 sub-carriers with indices 0, 8, 16, 24, 32, and so on. OFDM symbols transmitted by the first Tx calibration element (410-2) may use 230 sub-carriers with indices 1, 9, 17, 25, 33, and so on. OFDM symbols transmitted by element 8 may use 230 sub-carriers with indices 7, 15, 23, 31, and so on. Accordingly, calibrating signals can be orthogonalized across the multiple active transmitting calibration elements by using OFDM sub-carrier allocation.

The OFDM symbols from each individual Tx calibration element are transmitted sequentially (Step 622), and the multiple Tx calibration elements are configured to transmit symbols in parallel. Further, Rx element 420 discards the first OFDM symbol of the received Rx OFDM symbols (and may optionally discard the last OFDM symbol of the received Rx OFDM symbols, but discarding the last OFDM symbol of the received Rx OFDM symbols is not necessary), and accumulates and averages the remaining OFDM symbols of the received Rx OFDM symbols into a memory device (Step 623). For example, Rx element 420 can accumulate received OFDM symbols into a RAM device. After performing an FFT on the accumulated OFDM symbol, different Tx channels can be processed by processing the corresponding subsets of sub-carriers. For example, OFDM symbols corresponding to an same Tx calibration element can be isolated from other Tx calibration element and can be averaged. In the example of orthogonalization by using OFDM sub-carrier allocation, 1 RAM block per LTE channel may be be sufficient for covering 8 Tx elements.

In the example of Rx calibration, element 420 can operate as a Tx element and multiple elements 410-1 to 410-8 can operate as multiple Rx elements, and accordingly, there is no need to use orthogonalization (by OFDM sub-carrier allocation or orthogonal BPSK codes) for suppressing the interference due to multiple Tx elements. Element 420 (operate as a Tx element) transmits a plurality of OFDM symbols sequentially, where orthogonalization by the OFDM sub-carrier allocation or orthogonal BPSK codes is not needed for the OFDM symbols, and accordingly, grouping for code bits of orthogonal BPSK codes is not needed. For example, Element 420 transmits a long sequence of a repeated time-domain OFDM symbol (e.g., with no gap). Each Rx element (410-1 to 410-8) discards the first OFDM symbol of the received Rx OFDM symbols (and may optionally discard the last OFDM symbol of the received Rx OFDM symbols, but discarding the last OFDM symbol of the received Rx OFDM symbols is not necessary), and accumulates and averages the remaining OFDM symbols of the received Rx OFDM symbols into a memory device.

The accumulated OFDM signals can be post-processed by a processing device (such as the processing device 125 in FIG. 1) for calibration parameter estimation. In particular, the following processing functions can be performed for each accumulated symbol:

1) FFT and remove BPSK (or QAM) modulation from the active sub-carriers

2) Delay estimation using the 'Weighted Normalised Linear Predictor' (WNLP):

$$\hat{T}_d = \frac{\text{angle}\left\{\sum_{k=1}^{N-1} W_k \bar{Y}_k \bar{Y}_{k-1}^*\right\}}{2\pi \Delta f},$$

$$\bar{Y}_k = \frac{Y_k}{|Y_k|},$$

$W_k$ = optimal (fixed) weights, $\Delta f$ = Sub-carrier spacing in Hz

In article entitled "improved Single Frequency Estimation With Wide Acquisition Range" by A. B. Awoseyila et al. (A. B. Awoseyila, C. Kasparis and B. G. Evans, Electronics Letters, Vol. 44(3), pp. 245-247; 31 Jan. 2008), the estimator is proposed for time-domain carrier frequency estimation but is also applicable for frequency-domain delay estimation. It is shown to achieve the CRB even at relatively low SNRs. Similar alternatives to the WNLP estimator as described in that article by A. B. Awoseyila et al. and references therein are also applicable.

3) Phase Estimation:

$$\hat{\Phi} = \text{angle}\left\{\frac{1}{N}\sum_{k=0}^{N-1} Y_k e^{-j2\pi k \Delta f \hat{T}_d}\right\}$$

4) Amplitude Estimation:

$$\hat{A} = \frac{1}{N}\sum_{k=0}^{N-1}|Y_k|$$

It is noted that the OFDM technique allows computing different parameter estimates for different frequency ranges, if there is in-band amplitude and phase variation. However, the default assumption is that a single set of parameter estimates will be produced for the whole band covered by the calibration signal.

Performance

In the application of the OFDM technique in array calibration, the set target on delay estimation performance is commonly the most demanding and therefore dictates the overall calibration time. Therefore, this section focuses on the delay estimation performance of the OFDM technique.

The WNLP estimator has been shown to achieve the Cramer-Rao Bound (CRB) even for relatively low SNR levels. This result has been verified by additional simulations for the specific application of the algorithm in OFDM based array calibration.

Based on this, the total time duration (T seconds) of the OFDM signal required for achieving a given delay estimate RMSE target ($RMSE_T$ seconds) is given by this equation:

$$T = \frac{6}{4 \cdot \pi^2 \cdot SNR \cdot (RMSE_T)^2 \cdot (F_s)^3} \cdot \frac{N^2}{(N_A^2 - 1)}$$

Where:
$F_s$ is the sampling frequency in Hz of the baseband OFDM signal
SNR is the Signal to Noise Ration over a Bandwidth equal to $F_s$
N is the total number of sub-carriers in the OFDM signal
$N_A$ is the active (non-zero) number of sub-carriers in the OFDM signal This equation suggests that reducing processing time is strongly dependent on the active bandwidth of the OFDM signal. Therefore using OFDM signals with high baseband sampling frequency and high percentage of active sub-carriers should be a design objective.

The table below gives some example figures that illustrate the dependency of T on the bandwidth of the OFDM signal

| Calib. Signal BW-Fs (MHz) | Utilised BW (Active Carriers) % | Rx SNR of Calib Signal BW (dB) | Rx SNR over Utilised BW (dB) | Calibration Time-T (s) |
|---|---|---|---|---|
| 20 | 90 | −15 | −14.54 | 7.418 |
| 20 | 100 | −15 | −15 | 6.008 |
| 10 | 90 | −12 | −11.54 | 29.78 |
| 10 | 100 | −12 | −12 | 24.09 |
| 5 | 90 | −9 | −8.54 | 119.6 |
| 5 | 100 | −9 | −9 | 96.6 |

Example Performance Comparison with CDMA-PN Code Based Calibration

Simulation Scenario:
Tx calibration with 8 Tx elements undergoing calibration and a single Rx element performing calibration signal observations and processing
Assumed SNR at the input of the calibration signal processing unit in the receiver=−15 dB
OFDM calibration signal parameters:
Baseband OFDM symbol with 2048 sub-carriers generated at 20 Msps with 1843 active sub-carriers (90% BW utilization)
8 Tx elements separated by 8-chip orthogonal codes
CDMA-PN calibration signal parameters:
Long complex PN codes at 10 Mcps
RRC filtering with 90% excess bandwidth in both transmit and receive
Orthogonal codes used minimizing interference between 8 Tx elements
64 parallel correlators used for covering a +/−1 chip interval (effective ×32 over-sampling)
Detect correlators' peak for gain/phase estimation and perform 3-point quadratic interpolation for delay estimation Simulation Results:

| | Calibration Time Required for obtaining a delay estimate with RMSE = 10ps (s) | Amplitude Estimate RMSE (dB) | Phase Estimate RMSE (°) |
|---|---|---|---|
| OFDM | 7.2 | −34 | 0.04 |
| CDMA-PN | 25 | Similar | Similar |
| OFDM with 50% bandwidth utilization | 24 | Similar | Similar |

The observed difference in performance is attributed mainly to the better bandwidth utilization of the OFDM signal. In particular, although both signals (OFDM and CDMA-PN) are sampled at Fs=20 Msps, the OFDM signal has a bandwidth utilization of about 90% and the CDMA-PN signal of about 50%; and accordingly, calibration time for OFDM is 7.2 second, less than calibration time of about 25 seconds for CDMA-PN. This observation is supported by the third simulated case in the Table.

In terms of processing complexity and power, the OFDM technique also has a significant advantage since processing is performed at 20 MHz with a simple sample accumulator, whereas the CDMA uses correlators operating at 320 MHz.

In the present disclosure, in some embodiments, the calibration signal is sometimes superposed over a carrier signal (such as a 3GPP signal which includes LTE, 5G, etc.) and since the calibration signal does not substantially interfere with the carrier signal, as a consequence, the increased PAPR associated with the OFDM signal is not a negative effect in this application.

In one aspect of the present disclosure, referring to FIGS. 1, 3, and 4, an antenna array includes a plurality of antenna elements (such as 130 of FIG. 1, 410, 420 of FIG. 4), where each of the plurality of antenna elements has a transmit path; and includes a processing device (such as 125 of FIG. 1) configured to feed an orthogonal-frequency-division-multiplexing (OFDM) calibration signal to the transmit path to perform transmit calibration.

In some examples, referring to FIGS. 1, 3, and 4, in the antenna array, the plurality of antenna elements (such as 130) each have a receive path, and the processing device (such as processing device 125 of FIG. 1) is configured to feed an orthogonal-frequency-division-multiplexing (OFDM) calibration signal to the receive path to perform receive calibration.

In certain examples, the processing device (such as processing device 125) may superimpose the OFDM calibration signal onto a carrier signal, for transmit, where the OFDM calibration signal's power is at least an order of magnitude smaller than the carrier signal's power, and does not substantially deteriorate the carrier signal PAPR. For example, the OFDM calibration signal's power can be approximately 1-10% of the carrier signal's power, so that the calibration signal's power is received at a very low level on the surface of the Earth, to avoid interference to the carrier signal.

In another example, the OFDM calibration signal is composed of many sub-carriers which can be independently estimated and can be combined into an accurate calibration estimate in a given duration.

In some examples, the transmit path includes a baseband to Radio Frequency converter, oscillator, Digital-to-Analog Converter, transmit Front End Module, and transmit antenna.

In certain examples, the receive path includes a Radio-Frequency to baseband converter, oscillator, Analog-to-Digital Converter, receive Front End Module, and receive antenna.

In another example, the receiver can have a carrier signal superposed with an OFDM calibration signal, whence the OFDM calibration signal's power is at least an order of magnitude smaller than the carrier signal's power, and thereby does not substantially deteriorate the carrier signal PAPR.

In yet another example, the processing device of the antenna array is configured to: select a centrally-located antenna element from amongst the plurality of antenna elements, the selected centrally-located element having a plurality of direct neighboring antenna elements of the plurality of antenna elements, each of the plurality of direct neighboring antenna elements being directly adjacent the selected central antenna element; transmit via the transmit path of the neighboring antenna elements, a plurality of OFDM calibration signals; and receive via the receive path of the selected central element, the plurality of OFDM calibration signals; and compute phase and amplitude of the selected central element and each neighboring antenna element of the plurality of direct neighboring antenna elements, according to the plurality of received OFDM signals.

In yet another aspect of the present disclosure, referring to FIGS. 1, 3, and 4, an antenna array includes a plurality of antenna elements (such as 130 of FIG. 1, 410, 420 of FIG. 4), where each of the plurality of antenna elements having a receive path; and a processing device (such as 125 of FIG. 1) configured to feed an orthogonal-frequency-division-multiplexing (OFDM) calibration signal to the receive path to perform receive calibration.

In some examples, the plurality of antenna elements each have a transmit path and the processing device is configured to feed an orthogonal-frequency-division-multiplexing (OFDM) calibration signal to the transmit path to perform receive calibration.

In certain examples, the processing device superimposes the OFDM calibration signal onto a carrier signal, whereby the OFDM calibration signal's power is at least an order of magnitude smaller than the carrier signal's power, and does not substantially deteriorate the carrier signal PAPR.

In another example, the OFDM calibration signal is composed of many sub-carriers which can be independently estimated and can be combined into an accurate calibration estimate in a given duration.

In some examples, the transmit path includes a baseband to Radio Frequency converter, oscillator, Digital-to-Analog Converter, transmit Front End Module, and transmit antenna.

In certain examples, the receive path includes a Radio-Frequency to baseband converter, oscillator, Analog-to-Digital Converter, receive Front End Module, and receive antenna.

In another example, the receiver has a superposed carrier signal and the OFDM calibration signal, whereby the OFDM calibration signal's power is at least an order of magnitude smaller than the carrier signal's power, and does not substantially deteriorate the carrier signal PAPR.

In various examples, the processing device is configured to: select a centrally-located antenna element from amongst the plurality of antenna elements, the selected centrally-located element having a plurality of direct neighboring antenna elements of the plurality of antenna elements, each of the plurality of direct neighboring antenna elements being directly adjacent the selected central antenna element; transmit via the transmit path of the neighboring antenna elements, a plurality of OFDM calibration signals; and receive via the receive path of the selected central element, the plurality of OFDM calibration signals; and compute phase and amplitude of the selected central element and each neighboring antenna element of the plurality of direct neighboring antenna elements, according to the plurality of received OFDM signals.

The invention claimed is:

1. An antenna array, comprising:
a plurality of antenna elements, each of the plurality of antenna elements having a transmit path; and
a processing device configured to feed an orthogonal-frequency-division-multiplexing (OFDM) calibration signal to the transmit path to perform transmit calibration, said processing device further configured to:
select a centrally-located antenna element from amongst the plurality of antenna elements, the selected centrally-located element having a plurality of direct neighboring antenna elements of the plurality of antenna elements, each of the plurality of direct neighboring antenna elements being directly adjacent the selected central antenna element;
transmit via the transmit path of the neighboring antenna elements, a plurality of OFDM calibration signals; and
receive via the receive path of the selected central element, the plurality of OFDM calibration signals; and
compute phase and amplitude of the selected central element and each neighboring antenna element of the plurality of direct neighboring antenna elements, according to the plurality of received OFDM signals.

2. The antenna array of claim 1, wherein the plurality of antenna elements each have a receive path and the processing device is configured to feed an orthogonal-frequency-division-multiplexing (OFDM) calibration signal to the receive path to perform receive calibration.

3. The antenna array of claim 1, the processing device superimposing the OFDM calibration signal onto a carrier signal, whereby the OFDM calibration signal's power is at least an order of magnitude smaller than the carrier signal's power, and does not substantially deteriorate the carrier signal PAPR.

4. The antenna array of claim 1, wherein the OFDM calibration signal is composed of many sub-carriers which can be independently estimated and can be combined into an accurate calibration estimate in a given duration.

5. The antenna array of claim 1, wherein the transmit path includes a baseband to Radio Frequency converter, oscillator, Digital-to-Analog Converter, transmit Front End Module, and transmit antenna.

6. The antenna array of claim 2, wherein the receive path includes a Radio-Frequency to baseband converter, oscillator, Analog-to-Digital Converter, receive Front End Module, and receive antenna.

7. The antenna array of claim 2, wherein the receiver may have a superposed carrier signal and the OFDM calibration signal, whereby typically, the OFDM calibration signal's power is at least an order of magnitude smaller than the carrier signal's power, and thereby does not substantially deteriorate the carrier signal PAPR.

8. The antenna array of claim 1, wherein the OFDM calibration signal is pre-computed.

9. An antenna array, comprising:
a plurality of antenna elements, each of the plurality of antenna elements having a receive path; and
a processing device configured to feed an orthogonal-frequency-division-multiplexing (OFDM) calibration signal to the receive path to perform receive calibration, said processing device further configured to:
select a centrally-located antenna element from amongst the plurality of antenna elements, the selected centrally-located element having a plurality of direct neighboring antenna elements of the plurality of antenna elements, each of the plurality of direct neighboring antenna elements being directly adjacent the selected central antenna element;
transmit via the transmit path of the neighboring antenna elements, a plurality of OFDM calibration signals; and
receive via the receive path of the selected central element, the plurality of OFDM calibration signals; and
compute phase and amplitude of the selected central element and each neighboring antenna element of the plurality of direct neighboring antenna elements, according to the plurality of received OFDM signals.

10. The antenna array of claim 9, wherein the plurality of antenna elements each have a transmit path and the processing device is configured to feed an orthogonal-frequency-division-multiplexing (OFDM) calibration signal to the transmit path to perform receive calibration.

11. The antenna array of claim 10, the processing device superimposing the OFDM calibration signal onto a carrier signal, whereby the OFDM calibration signal's power is at least an order of magnitude smaller than the carrier signal's power, and does not substantially deteriorate the carrier signal PAPR.

12. The antenna array of claim 9, wherein the OFDM calibration signal is composed of many sub-carriers which can be independently estimated and can be combined into an accurate calibration estimate in a given duration.

13. The antenna array of claim 10, wherein the transmit path includes a baseband to Radio Frequency converter, oscillator, Digital-to-Analog Converter, transmit Front End Module, and transmit antenna.

14. The antenna array of claim 9, wherein the receive path includes a Radio-Frequency to baseband converter, oscillator, Analog-to-Digital Converter, receive Front End Module, and receive antenna.

15. The antenna array of claim 9, wherein the receiver has a superposed carrier signal and the OFDM calibration signal, whereby the OFDM calibration signal's power is at least an order of magnitude smaller than the carrier signal's power, and does not substantially deteriorate the carrier signal PAPR.

* * * * *

UNITED STATES PATENT AND TRADEMARK OFFICE
CERTIFICATE OF CORRECTION

PATENT NO. : 11,581,958 B2
APPLICATION NO. : 17/696547
DATED : February 14, 2023
INVENTOR(S) : Sriram Jayasimha et al.

It is certified that error appears in the above-identified patent and that said Letters Patent is hereby corrected as shown below:

In the Claims

Column 19, Line 2, Claim 4:
Now reads: "composed of many"; should read -- composed of a plurality of --

Column 19, Line 13, Claim 7:
Now reads: "the receiver"; should read -- a receiver --

Column 20, Line 19, Claim 12:
Now reads: "composed of many"; should read -- composed of a plurality of --

Column 20, Line 30, Claim 15:
Now reads: "wherein the reciever"; should read -- wherein a receiver --

Signed and Sealed this
Second Day of April, 2024

Katherine Kelly Vidal
*Director of the United States Patent and Trademark Office*